United States Patent
Eguro et al.

(10) Patent No.: US 8,896,455 B2
(45) Date of Patent: Nov. 25, 2014

(54) INTRUSION DETECTION AND COMMUNICATION

(75) Inventors: Kenneth Eguro, Seattle, WA (US);
Alessandro Forin, Bellevue, WA (US);
Ray A. Bittner, Jr., Woodinville, WA (US); Ji Sun, Shenzhen (CN)

(73) Assignee: Microsoft Corporation, Redmond, WA (US)

( * ) Notice: Subject to any disclaimer, the term of this patent is extended or adjusted under 35 U.S.C. 154(b) by 300 days.

(21) Appl. No.: 13/334,057

(22) Filed: Dec. 22, 2011

(65) Prior Publication Data

US 2013/0044003 A1    Feb. 21, 2013

Related U.S. Application Data

(60) Provisional application No. 61/525,142, filed on Aug. 18, 2011.

(51) Int. Cl.
| | |
|---|---|
| *G08B 21/00* | (2006.01) |
| *G06F 21/86* | (2013.01) |
| *G06F 21/55* | (2013.01) |
| *H04L 29/06* | (2006.01) |

(52) U.S. Cl.
CPC ............... *G06F 21/554* (2013.01); *G06F 21/86* (2013.01); *H04L 63/1425* (2013.01); *G06F 2221/2101* (2013.01)
USPC ........... 340/653; 340/635; 340/540; 340/541; 340/657; 324/649

(58) Field of Classification Search
USPC ........ 340/653, 635, 540, 657, 658, 661, 541, 340/545.2; 324/600, 647, 649, 652, 655, 324/681, 682, 683; 235/385, 441, 488, 492
See application file for complete search history.

(56) References Cited

U.S. PATENT DOCUMENTS

| | | | | |
|---|---|---|---|---|
| 4,647,913 | A | * | 3/1987 | Pantus ........................ 340/506 |
| 5,510,720 | A | * | 4/1996 | Vauclin ....................... 324/652 |
| 5,764,111 | A | | 6/1998 | Bushman |
| 6,373,341 | B1 | | 4/2002 | Morgan |
| 7,656,189 | B1 | | 2/2010 | Trimberger |

(Continued)

OTHER PUBLICATIONS

Eren, et al., "Fringe-Effect Capacitive Proximity Sensors for Tamper Proof Enclosures", Retrieved at <<http://ieeexplore.ieee.org/stamp/stamp.jsp?tp=&arnumber=4027448>>, Sicon/05-Sensors for Industry Conference, Feb. 8-10, 2005, pp. 22-26.

(Continued)

*Primary Examiner* — Anh V La
(74) *Attorney, Agent, or Firm* — Steve Wright; Dan Choi; Micky Minhas

(57) ABSTRACT

An intrusion detection system disclosed herein includes a detector circuit that measures a change in value of impedance of an interconnection circuitry. A decoder coupled to the detector decodes the measured value of the change in the impedance of the interconnection circuitry to determine existence of an abnormal condition. In an example implementation of the intrusion detection system, the change in the value of the impedance of the interconnection circuitry is represented by a change in the phase delay on the interconnection circuitry. An implementation of the intrusion detection circuit terminates communication using the interconnection circuitry upon detection of the abnormal condition. The intrusion detection system is further configured to interpret the abnormal condition as a communication signal to the interconnection circuitry.

18 Claims, 6 Drawing Sheets

(56) References Cited

U.S. PATENT DOCUMENTS

| | | | |
|---|---|---|---|
| 8,598,890 B2* | 12/2013 | Lewis et al. | 324/649 |
| 2010/0031064 A1 | 2/2010 | Walmsley | |
| 2010/0303187 A1 | 12/2010 | Kobayashi et al. | |
| 2011/0031982 A1* | 2/2011 | Leon et al. | 324/649 |
| 2011/0056215 A1 | 3/2011 | Ham et al. | |

OTHER PUBLICATIONS

Alkabani, et al., "Consistency-Based Characterization for IC Trojan Detection", Retrieved at <<http://ieeexplore.ieee.org/stamp/stamp.jsp?tp=&arnumber=5361304>>, IEEE/ACM International Conference on Computer-Aided Design Digest of Technical Papers, Nov. 2-5, 2009, pp. 123-127.

Rad, et al., "A Sensitivity Analysis of Power Signal Methods for Detecting Hardware Trojans under Real Process and Environmental Conditions", Retrieved at <<http://www.ece.unm.edu/~jimp/pubs/TVLSI_trojan_sensitivity_FINAL.pdf>>, IEEE Transactions on Very Large Scale Integration Systems, vol. 18, No. 12, Dec. 2010, pp. 1735-1744.

Jin, et al., "Hardware Trojan Detection using Path Delay Fingerprint", Retrieved at <<http://ieeexplore.ieee.org/stamp/stamp.jsp?tp=&arnumber=4559049>>, IEEE International Workshop on Hardware-Oriented Security Trust (HOST), Jun. 9, 2008, pp. 51-57.

Banga, Mainak, "Partition Based Approaches for the Isolation and Detection of Embedded Trojans in ICs", Retrieved at <<http://scholar.lib.vt.edu/theses/available/etd-09042008-155719/unrestricted/MS_Thesis_Mainak.pdf>>, Sep. 1, 2008, pp. 65.

Adamov, et al., "The Problem of Hardware Trojans Detection in System-on-chip", Retrieved at <<http://ieeexplore.ieee.org/stamp/stamp.jsp?tp=&arnumber=4839798>>, Proceedings of the 10th International Conference on the Experience of Designing and Application of CAD Systems in Microelectronics (CADSM), Feb. 24-28, 2009, pp. 178-179.

Agrawal, et al., "The EM Side—Channel(s): Attacks and Assessment Methodologies", Retrieved at <<http://citeseerx.ist.psu.edu/viewdoc/download?doi=10.1.1.122.1646&rep=rep1&type=pdf>>, International Workshop on Cryptographic Hardware and Embedded Systems, 2002, pp. 1-42.

Agrawal, et al., "Trojan Detection using IC Fingerprinting", Retrieved at <<http://ieeexplore.ieee.org/stamp/stamp.jsp?tp=&arnumber=4223234>>, IEEE Symposium on Security and Privacy, May 20-23, 2007, pp. 296-310.

Bar-El, Hagai, "Introduction to Side-channel Attacks", Retrieved at <<http://www.discretix.com/images/stories/Introduction_to_Side_Channel_Attacks.pdf>>, White Paper, pp. 12.

Bar-El, et al., "The Sorcerer's Apprentice Guide to Fault Attacks", Retrieved at <<http://ieeexplore.ieee.org/stamp/stamp.jsp?tp=&arnumber=1580506>>, IEEE, vol. 94, No. 2, Feb. 2006, pp. 370-382.

Becker, et al., "Side-channel based Watermarks for IP Protection", Retrieved at <<http://cosade2010.cased.de/files/proceedings/cosade2010_paper_9.pdf>>, Proceedings of the First International Workshop on Constructive Side-Channel Analysis and Secure Design (COSADE), 2010, pp. 47-50.

Bittner, Ray, "The Speedy DDR2 Controller for FPGAs", Retrieved at <<http://research.microsoft.com/pubs/81822/The%20Speedy%20DDR2%20Controller%20For%20FPGAs%20ERSA%202009%20Final.pdf>>, International Conference on Engineering of Reconfigurable Systems & Algorithms, 2009, pp. 7.

Chari, et al., "Template Attacks", Retrieved at <<http://saluc.engr.uconn.edu/refs/sidechannel/chari02template.pdf>>, International Workshop on Cryptographic Hardware and Embedded Systems (CHES), LNCS 2523, 2002, pp. 13-28.

"Microsystems Technology Symposium Enabling the Future", Retrieved at <<http://www.dtic.mil/cgi-bin/GetTRDoc?Location=U2&doc=GetTRDoc.pdf&AD=ADA503735>>, Mar. 5-7, 2007, pp. 11.

Mulder, et al., "Electromagnetic Analysis Attack on an FPGA Implementation of an Elliptic Curve Cryptosystem", Retrieved at <<http://ieeexplore.ieee.org/stamp/stamp.jsp?tp=&arnumber=1630348>>, International Conference on Computer as a Tool (EUROCON), 2005, pp. 1879-1882.

"The I2C-bus Specification", Retrieved at <<http://www.nxp.com/documents/other/39340011.pdf>>, Version 2.1, NXP, Jan. 2000, pp. 1-46.

Lenz, et al., "Thermal Resistance: Theory and Practice", Retrieved at <<http://www.infineon.com/dgdl/smdpack.PDF?folderId=db3a304412b407950112b417b3e623f4&fileId=db3a304412b407950112b417b42923f5>>, Infineon Technologies AG, Jan. 2000, pp. 36.

Lin, et al., "Trojan Side-channels: Lightweight Hardware Trojans through Side-channel Engineering", Retrieved at <<http://www.rfid-cusp.org/papers/Trojan-side-channel.pdf>>, Proceedings of the 11th International Workshop on Cryptographic Hardware and Embedded Systems, 2009, pp. 1-14.

Lopez-Buedo, et al., "Dynamically Inserting, Operating, and Eliminating Thermal Sensors of FPGA-based Systems", Retrieved at <<http://ieeexplore.ieee.org/stamp/stamp.jsp?tp=&arnumber=1178745>>, IEEE Transactions on Components and Packaging Technologies, vol. 25, No. 4, Dec. 2002, pp. 561-566.

"Virtex-5 FPGA Packaging and Pinout Specification UG195 (v4.7)", Retrieved at <<http://www.xilinx.com/support/documentation/user_guides/ug195.pdf>>, Xilinx Inc., Version 4.8, Dec. 9, 2009, pp. 416.

"Part Number: CP85338", Retrieved at <<Part Number: CP85338>>, Datasheet, V-Infinity Inc., Aug. 2009, pp. 3.

Zick, et al., "On-line Sensing for Healthier FPGA Systems", Retrieved at <<http://www.eecs.umich.edu/~jhayes/KZ_FPGAcamera_Final_Feb-10.pdf>>, Proceedings of the 18th annual ACM/SIGDA international symposium on Field programmable gate arrays (FPGA), Feb. 21-23, 2010, pp. 239-248.

Ziener, et al., "Using the Power Side Channel of FPGAs for Communication", Retrieved at <<http://www12.informatik.uni-erlangen.de/publications/pub2010/ZBT10.pdf>>, Proceedings of the 18th IEEE Annual International Symposium on Field-Programmable Custom Computing Machines (FCCM), 2010, pp. 237-244.

Lv, et al., "A Fast Optical Wavelength-Tunable Transmitter With", Retrieved at <<http://ieeexplore.ieee.org/stamp/stamp.jsp?arnumber=04785159, IEEE Electron Device Letters, vol. 30, No. 4, Apr. 2009, pp. 353-355.

Tang, et al., "A 9.8-11.5-GHz Quadrature Ring Oscillator for Optical Receivers", Retrieved at <<http://alexandria.tue.nl/openaccess/Metis148763.pdf>>, IEEE Journal of Solid-State Circuits, vol. 37, No. 3, Mar. 2002, pp. 438-442.

Kim, et al., "CMOS Temperature Sensor with Ring Oscillator for Mobile DRAM Self-refresh Control", Retrieved at <<http://ieeexplore.ieee.org/stamp/stamp.jsp?tp=&arnumber=4542112>>, Circuits and Systems ISCAS, May 18-21, 2008, pp. 3094-3097.

"Ace Compiler", Retrieved at <<http://www.auspy.com/doc3.htm>>, Retrieved Date: Jun. 30, 2011, pp. 4.

* cited by examiner

INTRUSION DETECTION AND COMMUNICATION

CROSS REFERENCE TO RELATED APPLICATIONS

This application is related to U.S. patent application Ser. No. 13/334,054, entitled "Side Channel Communications" and filed concurrently herewith, which is specifically herein incorporated by reference for all that it discloses and teaches. This application takes priority from U.S. Provisional Patent Application No. 61/525,142, entitled "Side Channel Communications" and filed on Aug. 18, 2011, which is incorporated herein by reference for all that is discloses and teaches.

BACKGROUND

Electronic devices communicate with each other using a number of different methods. For example, integrated circuits (ICs) use input and output pins to communicate with other ICs or other devices. Such input and output pins are connected to other components or ICs using communication lines such as wires, traces, cables, etc. Because such communication lines connecting the devices carry information, they are natural targets for hackers or other parties that are interested in getting unauthorized access to the information being communicated on such communication lines. For example, by tapping an external lead onto a wire connecting two devices, a third party can access information being communicated on that wire and/or affect the information being communicated between the two devices. Furthermore, such communication lines between electronic devices are also the likely locations for integrating external unauthorized devices such as probes, which also affect the performance of the electronic devices and the ICs. For example, addition of the external components drains power, therefore, affecting the length of battery usage.

The security of the communications between the devices on a circuit board can be improved by encrypting the communication between the devices on the circuit board. However, such encryption does not necessarily prevent simple intrusion or attacks. Furthermore, such encryption techniques also do not defend against a determined adversary that is interested in capturing a large volume of communications for off-line decryption analysis. Moreover, using such encryption techniques adversely affects the speed of communication between the devices and the time necessary for processing of the communicated information.

SUMMARY

Implementations described and claimed herein address the foregoing problems by providing an intrusion detection system for detecting intrusion or tampering of digital circuitry. The intrusion detection system includes a circuit board including various integrated circuits (ICs) and an interconnection circuitry connecting the ICs. A detector circuit measures a change in the value of an impedance of the interconnection circuitry to generate a difference signal. A decoder circuit coupled to the detector circuit decodes the difference signal to determine the existence of an abnormal condition such as an intrusion of the circuit board. The intrusion detection system sends a notification signal to an authority if an intrusion of the circuit board is detected.

Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTIONS

The intrusion detection system disclosed herein allows detecting external intrusion into a circuit board by measuring a change in the operating characteristic of an interconnection circuitry of the circuit board. For example, the impedance of an interconnection circuitry connecting two integrated circuits (ICs) located on the circuit board is monitored to determine any abnormal changes in the impedance. If an intruder, such as a hacker, attempts to tamper with the circuit board, such tampering changes the impedance of the interconnection circuitry. The intrusion detection system monitors the value of such impedance to detect any tampering.

In an implementation of the intrusion detection system, a phase delay for a signal communicated on an interconnection circuitry between two ICs is used to monitor the impedance of the external connection pin. Monitoring such phase delay allows proper communication, for instance to keep two external signals synchronized. Because the length and other characteristics of the interconnection circuitry, such as the resistance, the temperature, the inductance, etc., connecting the two ICs are not known in advance, the phase delay is computed dynamically during an initial (or subsequent) calibration phase. For example, a baseline value of the phase delay for the signal transmitted on the interconnection circuitry is stored in a memory and compared with the periodically measured value of the phase delay. A decoder circuit evaluates the difference between the baseline value of the phase delay and the measured value of the phase delay. In the absence of any tampering of the circuit board, such difference is expected to be less than a threshold value. Therefore, if the value of such difference is above the threshold value, the detector generates an intrusion detection signal representing circuit board tampering or intrusion. The phase delay is dynamically affected by additional factors such as temperature, but these effects are much smaller compared to effect of either the length of the wire (that cannot change dynamically) or the additional impedance of a tampering device.

In one implementation, the intrusion detection system includes an actuator circuit that terminates communication using the internal circuit in response to receiving the intrusion detection signal. In an alternative implementation, the actuator circuit causes the internal circuit to operate in a specialized debugging mode in response to receiving the intrusion detection signal. Other implementations of the intrusion detection system monitor multiple internal circuitries on a circuit board to detect presence of external intrusion. In yet alternative implementation, the actuator interprets the intrusion detection signal to generate a communication signal communicated by the circuit board via an external transmitter.

Figure 1:
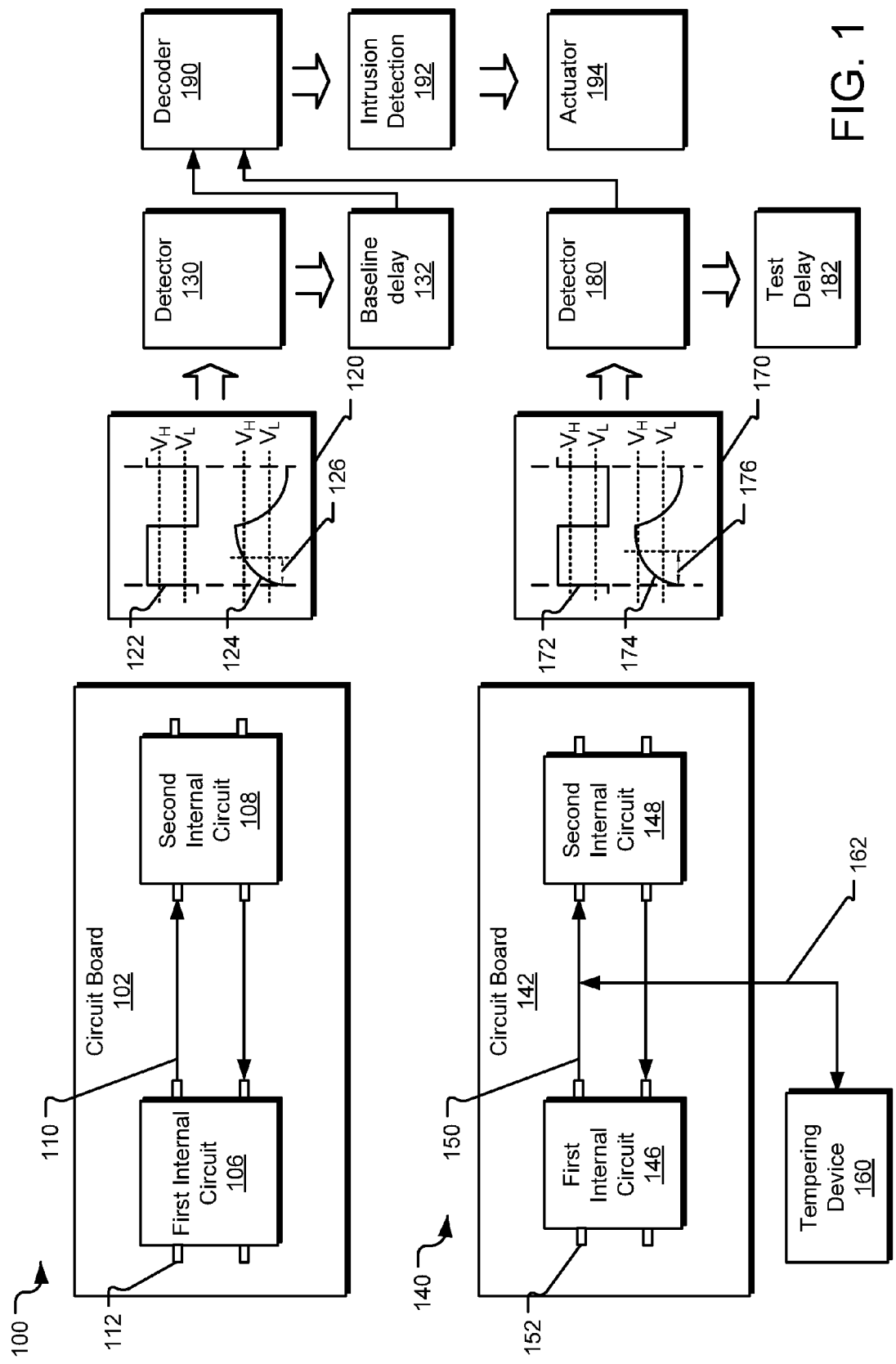
FIG. 1 illustrates example data sources and flows for an intrusion detection system.

FIG. 1 illustrates example data sources and flows for an intrusion detection system 100 for a device using a circuit board 102. In one implementation, the circuit board 102 is a digital circuit using various digital components, such as CMOS digital components, field-programmable gate array (FPGA) components, etc. The circuit board 102 includes a first internal circuit 106 communicating with a second internal circuit 108 using an interconnection circuitry 110. In one implementation, the first internal circuit 106 and the second internal circuit 108 are integrated circuits (ICs). The first internal circuit 106 and the second internal circuit 108 communicate with each other and with other components of the circuit board 102 using various input/output pins 112. The phase delay relationship between the first internal circuit 106 and the second internal circuit 108 is relatively stable if no changes are made to the operating characteristics and operating conditions of the circuit board 102, and especially the interconnection circuitry 110 linking the two ICs. Furthermore, the phase delay between the first internal circuit 106 and the second internal circuit 108 can be measured by implementing simple digital logic structures inside the internal circuits 106 and 108.

Such phase delay relationship between the first internal circuit 106 and the second internal circuit 108 depends, upon other things, on the impedance of the interconnection circuitry 110. The impedance of interconnection circuitry 110 is a function of a number of parameters, including the capacitance, the resistance, and the inductance on the interconnection circuitry 110. Specifically, the impedance of the interconnection circuitry 110 depends on the structural characteristics of the interconnection circuitry 110, the structural characteristics of the first internal circuit 106, and the structural characteristics of the second internal circuit 108. Typically, the impedance of the interconnection circuitry 110 does not change substantially from its initial value after the manufacturing of the circuit board 102.

The impedance of the interconnection circuitry 110 affects various operating characteristics of the interconnection circuitry 110, such as the phase delay for the signals communicated over the interconnection circuitry 110, the slew rate of the signals communicated over the interconnection circuitry 110, etc. For example, a signal diagram 120 illustrates the timeline for communications between the first internal circuit 106 and the second internal circuit 108. Specifically, the signal diagram 120 illustrates a signal 122 being communicated from the first internal circuit 106 to the second internal circuit 108. For example the signal 122 is a square wave signal that communicates particular information from the first internal circuit 106 to the second internal circuit 108.

The impedance of the interconnection circuitry 110 affects the time at which the output on the interconnection circuitry 110 crosses $V_H$, the threshold voltage for a logic "1" value of the signal 122. This is illustrated by the actual value of the signal 124 on the interconnection circuitry 110. As shown in the signal diagram 120, a slew time $t_{slew}$ 126 represents the time it takes for the signal 124 on the interconnection circuitry 110 to rise to the threshold voltage $V_H$. The slew time $t_{slew}$ 126 also represents the time it takes for the signal 124 on the interconnection circuitry to decline from its peak value to the lower threshold voltage $V_L$.

The slew time $t_{slew}$ 126 is detected by a detector 130. In one implementation of the intrusion detection system 100, the detector saves the slew time $t_{slew}$ 126 as the baseline delay 132. For example, the baseline delay 132 is saved in a memory on the circuit board 102. The baseline delay 132 depends on the operational characteristics of the interconnection circuitry 110. Specifically, the baseline delay 132 depends on the cumulative capacitive, resistive, and inductive load of the various wires and other pins connected to a source internal circuit generating the signal on the interconnection circuitry 110, such as the first internal circuit 106, the delay characteristics of the source internal circuit generating the signal, and the drive strength of the signal generated by the source internal circuit generating the signal.

In one implementation, the baseline delay 132 is determined relatively soon after the manufacturing of the circuit board 102. In such an implementation, the baseline delay 132 is stored in a non-volatile memory (not shown) on the circuit board 102 for future field use. In an alternative implementation, the baseline delay 132 is determined upon first use of the circuit board 102 in the field. In such a case, the baseline delay 132 also reflects the environmental operating condition of the circuit board 102.

FIG. 1 also illustrates an instance of an intrusion detection system 140 where a circuit board 142 is tampered with by an external tampering device 160. The circuit board 142 includes a first internal circuit 146 communicating with a second internal circuit 148 using an interconnection circuitry 150. The first internal circuit 146 and the second internal circuit 148 communicate with each other and with other components of the circuit board 142 using various input/output pins 152. The impedance of interconnection circuitry 150 is a function of a number of parameters, including the capacitance, the resistance, and the inductance of the interconnection circuitry 150. Specifically, the impedance of the interconnection circuitry 150 depends on the structural characteristics of the interconnection circuitry 150, the structural characteristics of the first internal circuit 146, and the structural characteristics of the second internal circuit 148.

The tampering device 160 communicates with the interconnection circuitry 150 using a sensing wire 162. For example, the tampering device 160 is a sensor probe that is configured to read the information being communicated over the interconnection circuitry 150. In such a case, the tampering device 160 connects to the interconnection circuitry using a probe wire used as the sensing wire 162. In an alternative case, the tampering device 160 not only reads information being communicated over the interconnection circuitry 150, but it also changes such information being communicated over the interconnection circuitry 150. The connection of the sensing wire 162 to the interconnection circuitry 150 affects the operating characteristics, such as the impedance of the interconnection circuitry 150. The change in the impedance of the interconnection circuitry 150 also causes a change in the phase delay for the signal being communicated over the interconnection circuitry 150. For example, in a particular case, the connection of the sensing wire 162 to the interconnection circuitry 150 increases the capacitance of the interconnection circuitry 150. Such increased capacitance of the interconnection circuitry 150 causes the phase delay and the slew rate of the signal being communicated over the interconnection circuitry 150 to increase as well. In another alternative implementation, the tampering device 160 replaces the first internal circuit 146. Such replacing of the internal circuit 146 also affects the operating characteristics, such as the impedance of the interconnection circuitry 150, which in turn, causes a change in the phase delay for the signal being communicated over the interconnection circuitry 150.

A signal diagram 170 illustrates the timeline for the communication between the first internal circuit 146 and the second internal circuit 148 in the presence of the tampering device 160 and the sensing wire 162. Specifically, the signal diagram 170 illustrates a signal 172 being communicated from the first internal circuit 146 to the second internal circuit 148. For example the signal 172 is a square wave signal that communicates particular information from the first internal circuit 146 to the second internal circuit 148.

The impedance of the interconnection circuitry 150 affects the point at which the output on the interconnection circuitry 150 crosses $V_H$, the threshold voltage for a logic "1" value of the signal 172. This is illustrated by the actual value of the signal 174 on the interconnection circuitry 150. As shows in the signal diagram 170, a slew time $t_{slew}$ 176 represents the time it takes for the signal 174 on the interconnection circuitry 150 to rise to the threshold voltage $V_H$. The slew time $t_{slew}$ 176 also represents the time it takes for the signal 174 on the interconnection circuitry 150 to decline from its peak value to the lower threshold voltage $V_L$.

The slew time $t_{slew}$ 176 is detected by a detector 180. In one implementation of the intrusion detection system 100, the detector saves the slew time $t_{slew}$ 176 as the test delay 182. For example, the test delay 182 is saved in a memory on the circuit board 142. The test delay 182 depends on the operational characteristics of the interconnection circuitry 150. Specifically, the test delay 182 depends on the cumulative capacitive, resistive, and inductive loads of the various wires and other pins connected to a source internal circuit generating the signal on the internal circuit 150, such as the first internal circuit 146, the delay characteristics of such source internal circuit, and the drive strength of the signal generated by such source internal circuit.

Because the interconnection circuitry 150 is connected to the sensor wire 162, the operating characteristics of the interconnection circuitry 150 are different than the operating characteristics of the interconnection circuitry 110. As a result, the test delay 182 is also different from the baseline delay 132. In the illustrated implementation of the circuit board 142, the test delay 182 is greater than the baseline delay 132. This is also represented by the slew time $t_{slew}$ 176 being larger than the slew time $t_{slew}$ 126. Thus, in effect, the signal 174 takes longer time to reach the threshold voltage $V_H$ compared to the time taken by the signal 124 to reach the threshold voltage $V_H$.

The baseline delay 132 and the test delay 182 are communicated to a decoder 190. The decoder 190 analyzes the values of the baseline delay 132 and the test delay 182 to determine if there has been any tampering with the circuit board 142. For example, the decoder 190 calculates the difference between the baseline delay 132 and the test delay 182 and evaluates the difference to determine if there has been any tampering with the circuit board 142. If the difference between the baseline delay 132 and the test delay 182 is larger than a threshold difference, the decoder 190 determines that there has been some kind of tampering with the circuit board 142.

The value of the threshold used by the decoder 190 to determine whether a difference between the baseline delay 132 and the test delay 182 signifies a tampering of the circuit board 142 is determined based on expected variances in the operating characteristics of the circuit board 142. For example, the phase delay on the interconnection circuitry 150 is expected to vary from the baseline delay 132 within a small range due to changes in the operating condition of the circuit board 140, the changes in the temperature of the circuit board 140, etc. In one implementation, the threshold value used by the decoder 190 is changed periodically to reflect such changes in the operating conditions of the circuit board 140.

Upon detection of tampering with the circuit board 140, the decoder 190 generates an intrusion detection signal 192. In one implementation, the intrusion detection signal 192 is a binary signal that indicates whether there has been a tampering with the circuit board 140. In an alternative implementation, the intrusion detection signal 192 also identifies the level of intrusion. For example, if the difference between the baseline delay 132 and the test delay 182 is significantly large, the decoder 190 generates an intrusion detection signal 192 that also quantifies the size of such difference. In such an implementation, the analysis of the intrusion detection signal 192 also allows the intrusion detection system 100 to determine the type of tampering with the circuit board 140.

The intrusion detection signal 192 is communicated to an actuator 194 that is configured to take an action in response to the intrusion detection signal 192. For example, the actuator 194 causes the circuit board 140 to enter into a specialized debugging mode where the user of the circuit board 140 can easily test the functioning of the circuit board 140. In one implementation, such debugging mode operation of the circuit board 140 is implemented in a manner so that no external debugging connections are required. In an alternative implementation, the actuator 194 causes the communication over the interconnection circuitry 150 to be terminated so that the tampering device 160 cannot access any further information being communicated over the interconnection circuitry 150. Furthermore, the actuator 194 also communicates the information about the tampering to an external authority or other entity monitoring the functioning of the circuit board 140.

In an alternative implementation, the internal circuits 106 and 108 are configured to self-monitor any tampering with various interconnection circuits attached to their input/output pins. For example, the internal circuit 106 is configured to monitor an operating characteristic of the interconnection circuit 150 attached to its output pin. In such an implementation, a change in the operating characteristic of the interconnection circuit 150 causes the first internal circuit 106 to terminate any outgoing communication, including any communication with the second internal circuit 108 using the interconnection circuit 150.

While the intrusion detection system 100 uses the phase delay relationship between various internal circuits on a circuit board to determine presence of the circuit board tampering, in an alternative implementation, other operating characteristics, such as the timing of communication between the internal circuits is used to determine such presence of tampering.

Figure 2:
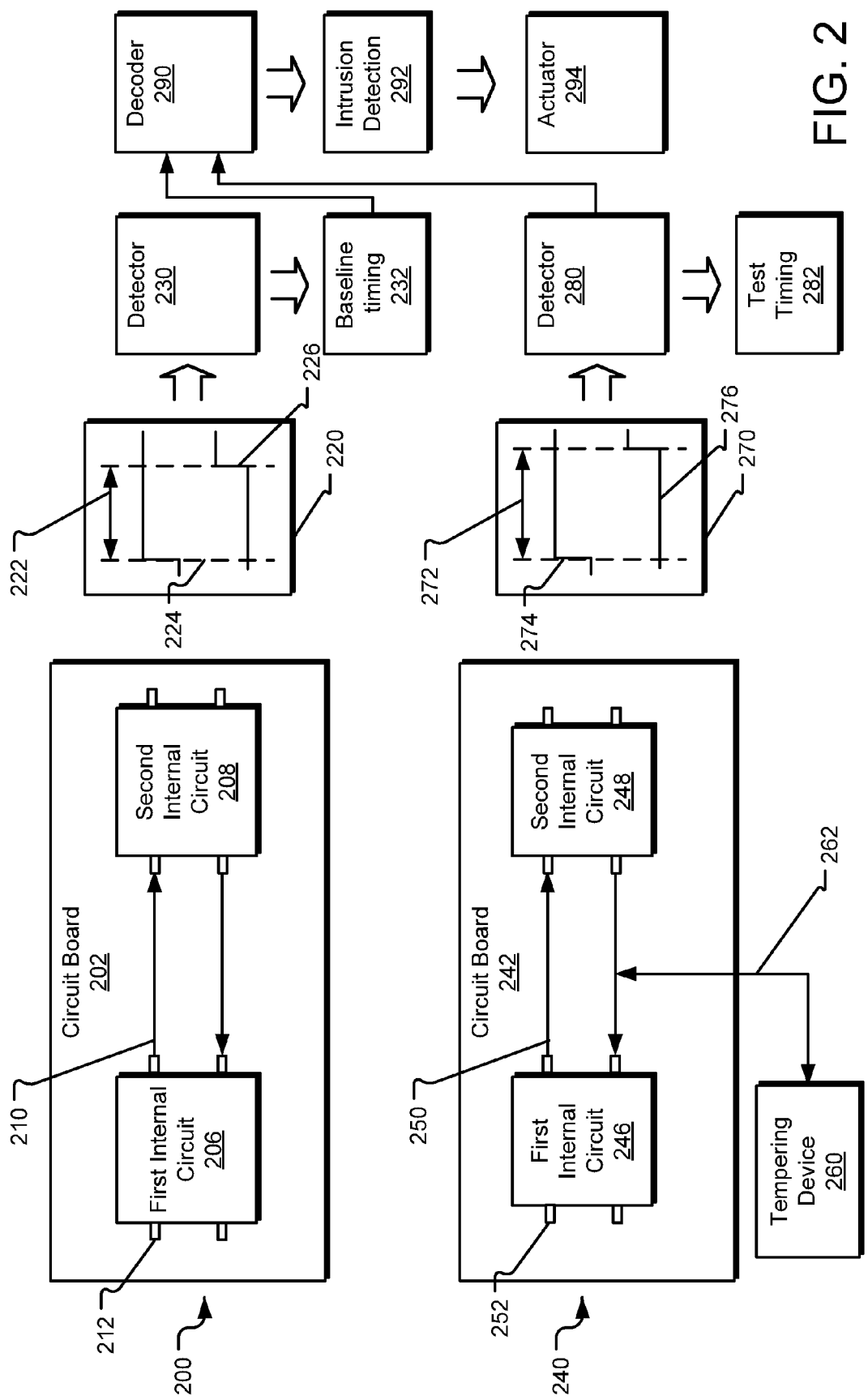
FIG. 2 illustrates alternative example data sources and flows for an intrusion detection system.

FIG. 2 illustrates alternative example data sources and flows for an intrusion detection system 200. Specifically, the intrusion detection system 200 includes a circuit board 202 including a first internal circuit 206 communicating with a second internal circuit 208 using an interconnection circuitry 210. The first internal circuit 206 and the second internal circuit 208 communicate with each other and with other components of the circuit board 202 using various input/output pins 212. The timing for the communication over the interconnection circuitry 210 is a function of various operational characteristics of the circuit board 202, including the impedance of the interconnection circuitry 210.

A signal diagram 220 illustrates the timeline for communications between the first internal circuit 206 and the second internal circuit 208. Specifically, the signal diagram 220 illustrates a timing 222 between a transmit time 224 when a signal is transmitted from the first internal circuit 206 and a receipt time 226 when the signal is received at the second internal circuit 208. In one implementation, the first internal circuit 206 and the second internal circuit 208 cooperate with each other to share the value of the transmit time 224 and the receipt time 226. For example, if the timing 222 is determined at the second internal circuit 208, the first internal circuit 206 communicates the transmit time 224 to the second internal circuit 208 with respect to a shared clock signal. The detector 230 stores the timing 222 as the baseline timing 232.

FIG. 2 also illustrates an instance of the intrusion detection system 240 where a circuit board 242 is tampered with by an external tampering device 260. The circuit board 242 is illustrated to have a first internal circuit 246 communicating with a second internal circuit 248 using an interconnection circuitry 250. The first internal circuit 246 and the second internal circuit 248 communicate with each other and with other components of the circuit board 242 using various input/output pins 252. The timing for the communication over the interconnection circuitry 250 is a function of various operational characteristics of the circuit board 242, including the impedance of the interconnection circuitry 250.

A signal diagram 270 illustrates the timeline for communications between the first internal circuit 246 and the second internal circuit 248. Specifically, the signal diagram 270 illustrates a timing 272 between a transmit time 274 when a signal is transmitted from the first internal circuit 246 and a receipt time 276 when the signal is received at the second internal circuit 248. The detector 280 stores the timing 272 as the test timing 282.

Each of the baseline timing 232 and the test timing 282 are communicated to a decoder 290. The decoder 290 analyzes the values of the baseline timing 232 and the test timing 282 to determine if there has been any intrusion of the circuit board 242. For example, the decoder 290 calculates the difference between the baseline timing 232 and the test timing 282 and evaluates the difference to determine if there has been any tampering with the circuit board 242. If the difference between the baseline timing 232 and the test timing 282 is larger than a threshold difference, the decoder 290 determines that there has been some kind of tampering with the circuit board 242.

Upon detection of tampering with the circuit board 240, the decoder 290 generates an intrusion detection signal 292. In one implementation, the intrusion detection signal 292 is a binary signal that indicates whether there has been a tampering with the circuit board 240. In an alternative implementation, the intrusion detection signal 292 also identifies the level of intrusion. The intrusion detection signal 292 is communicated to an actuator 294 that is configured to take an action in response to the intrusion detection signal 292. For example, the actuator 294 causes the circuit board 240 to enter into a specialized debugging mode where the user of the circuit board 240 can easily test the functioning of the circuit board 240. In an alternative implementation, the actuator 294 causes the communication over the interconnection circuitry 250 to be terminated so that the tampering device 260 cannot access any further information being communicated over the interconnection circuitry 250.

Figure 3:
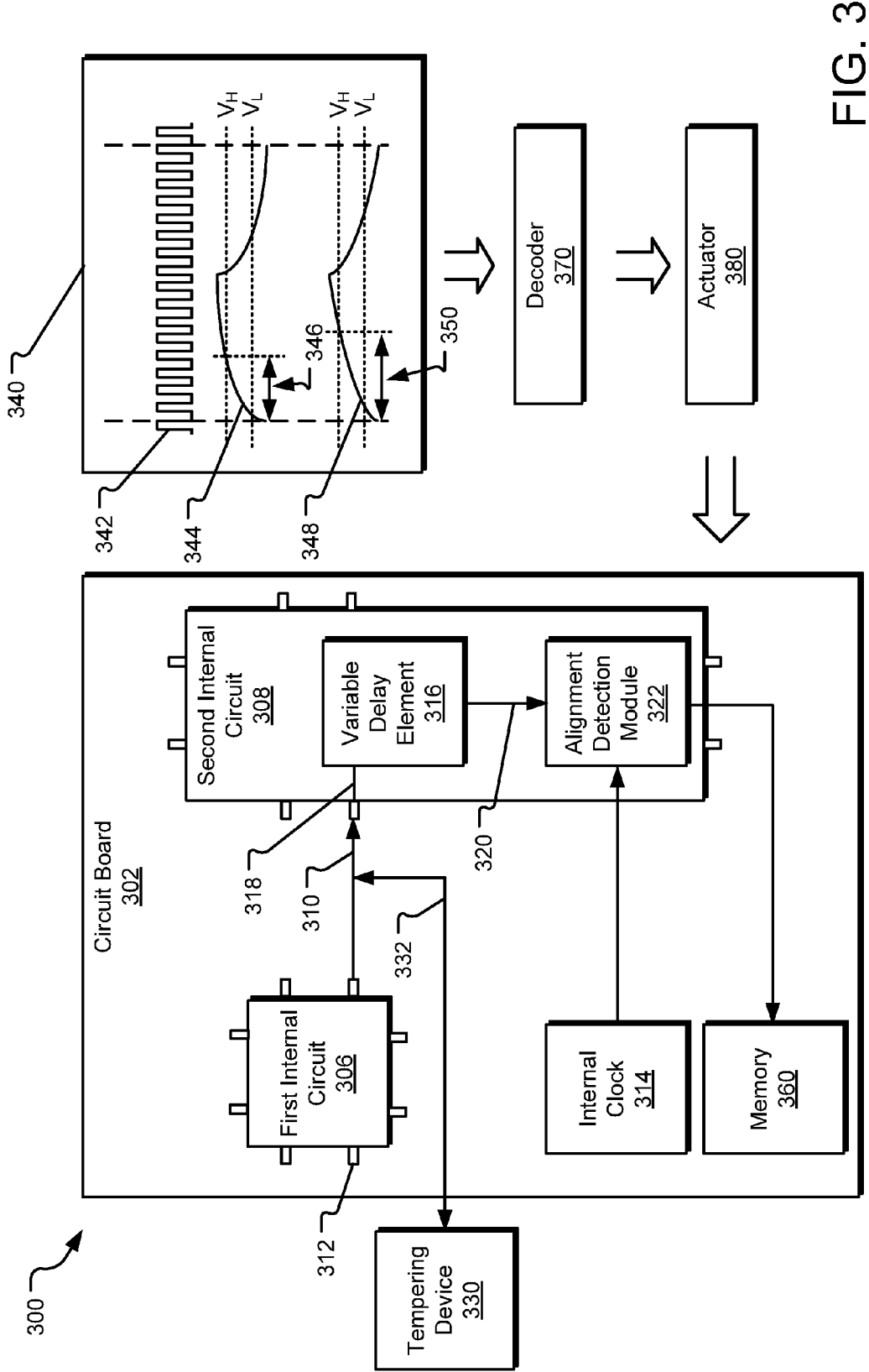
FIG. 3 illustrates other alternative example data sources and flows for an intrusion detection system.

FIG. 3 illustrates alternative example data sources and flows for an intrusion detection system 300. The intrusion detection system 300 includes a circuit board 302 including various components. Specifically, the circuit board 302 includes a first internal circuit 306 and a second internal circuit 308. In one implementation, each of the first internal circuit 306 and a second internal circuit 308 are ICs that communicate with each other and with other components of the circuit board 302 using various input/output pins 312. For example, the first internal circuit 306 and the second internal circuit 308 communicate with each other using an interconnection circuitry 310 that is attached to such input/output pins 312.

The intrusion detection system 300 also includes an internal clock 314 on the circuit board 302 to generate a clock signal. While the illustrated implementation of the intrusion detection system 300 illustrates the internal clock 314 as being external to the first internal circuit 306 and the second internal circuit 308, in an alternative implementation, the internal clock 314 is implemented on one of the first internal circuit 306 and the second internal circuit 308 using the existing components of one of the first internal circuit 306 and the second internal circuit 308.

The second internal circuit 308 includes a variable delay element 316 that delays an incoming signal 318 on the interconnection circuitry 310 by a variable amount of delay. The incoming signal 318 is a signal communicated to the second internal circuit 308 from the first internal circuit 306. The variable delay element 316 outputs a delayed incoming signal 320 that is input to an alignment detection module 322. The alignment detection module 322 measures the phase delay of the delayed incoming signal 320 using the clock signal generated by the internal clock 314 to determine the phase delay on the delayed incoming signal 320.

The phase delay relationship between the first internal circuit 306 and the second internal circuit 308 is expected to be relatively stable if no changes are made to the first internal circuit 306, the second internal circuit 308, and the interconnection circuitry 310. As a result, a predetermined amount of phase delay is expected between a signal received at the second internal circuit 308 from the first internal circuit 306 and an internal signal generated by the second internal circuit 308. Such predetermined amount of phase delay is expected to be relatively stable. To detect the changes in the phase delay relationship between the first internal circuit 306 and the second internal circuit 308, the variable delay element 316 delays the incoming signal 318 by the expected amount of phase delay.

The intrusion detection system 300 includes a tampering device 330 that is communicatively connected to the interconnection circuitry 310 via a sensing wire 332. In one implementation, the tampering device 330 is a probe that is configured to read the information being communicated over the interconnection circuitry 310. Connecting the sensing wire 332 to the interconnection circuitry 310 affects the capacitance, the resistance, and/or the inductance on the interconnection circuitry 310, resulting in a changed impedance of the interconnection circuitry 310. The changed impedance affects that relatively stable phase delay relationship between the first internal circuit 306 and the second internal circuit 308. As a result, the phase delay on the incoming signal 318 varies from its stable state value. The alignment detection module 322 detects such change in the phase delay of the incoming signal 318 from its stable state value.

The functioning of the alignment detection module 322 is explained in further detail in a signal diagram 340. The clock signal 342 illustrates the clock signal generated by the internal clock 314. The signal 344 illustrates the delayed incoming signal 320 in the absence of any changes to the operating characteristics of the circuit board 302. The signal 344 has a slew rate of 346, which indicates the time required for the signal 344 to rise from a low value to $V_H$. The slew rate 346 is measured using the clock signal 342. In one implementation, the slew rate 346 in the absence of any tampering with the circuit board 302 is stored in a memory 360 of the circuit board as the baseline slew rate. For example, the memory 360 is a random access memory (RAM), a read only memory (ROMs), or other types of memory implemented in the circuit board 302.

The signal 348 illustrates the delayed incoming signal 320 in the presence of the tampering device 330 and the sensing wire 332. The signal 348 has a slew rate of 350, which indicates the time required for the signal 348 to rise from a low value to $V_H$. In the illustrated implementation, the presence of the tampering device 330 and the sensing wire 332 affects the operating characteristics of the interconnection circuitry 310 in such a manner so as to increase the slew rate of the delayed incoming signal 320. However, in an alternative case, the presence of the tampering device 330 and the sensing wire 332 affects the operating characteristics of the interconnection circuitry 310 in such a manner so as to decrease the slew rate of the delayed incoming signal 320. The slew rate 350 is measured using the clock signal 342. The slew rate 350 in the presence of tampering with the circuit board 302 is also stored in a memory 360 of the circuit board as the test slew rate.

Given that the difference between the slew rate 344 and the slew rate 350 is generally small, an implementation of the intrusion detection system 300 uses an internal clock with a very high clock speed. For example, in one implementation, such internal clock speed is up to ten times the clock speed generally used by the first internal circuit 306 and the second internal circuit 308. In alternative implementations, other methods for determining phase delay, such as a method using a binary search operation that iteratively delays an incoming signal over a number of cycles is used. Yet alternatively, a calibration system that track transition of the signal 244 or a calibration system that stores the known patterns of the signal 244 to track the changes to the slew rate are used. An example of such calibration system is the method used to measure input signal delay in a double data rate synchronous dynamic memory system that uses a calibration state machine that locks on particular cycle/edge of an input signal to subsequently measure the changes to the input signal delay.

The intrusion detection system 300 also includes a decoder 370 that is configured to decode the change in the phase delay relationship between the first internal circuit 306 and the second internal circuit 308. For example, the decoder 370 evaluates a difference between the baseline slew rate and the test slew rate to determine presence of tampering of the circuit board 302. If the difference is relatively small, the decoder 370 determines that there is no tampering with the circuit board 302. However, if the difference is relatively large, the decoder 370 generates an output signal representing tampering with the circuit board 302. In one implementation, the decoder 370 uses a threshold value to evaluate the difference between the baseline slew rate and the test slew rate. In such implementation, if such difference is higher than the threshold, the decoder 370 generates an output signal representing tampering with the circuit board 302.

The decoder 370 communicates the output signal to an actuator 380. The actuator 380 is configured to take various actions in response to the output signal from the decoder 370. For example, if the output signal from the decoder 370 specifies tampering with the circuit board 302, the actuator 380 causes the circuit board 302 to enter into a debugging mode. In one implementation of the intrusion detection system 300, the circuit board 302 operates in a specialized debugging mode that allows a user to test the operation of the circuit board 302 without any specialized external debugging ports implemented on the circuit board 302 during manufacturing of the circuit board 302. In an alternative implementation, the actuator 380 ceases communication between the first internal circuit and 306 and the second internal circuit 308 to minimize the tampering device 330 getting any further useful information. The actuator 380 also generates a signal to an authority, such as an operator of the system using the circuit board 302 with a notification about the tampering with the circuit board 302.

While the implementation of the intrusion detection system 300 allows detecting tampering or hacking with the circuit board 302 using the phase delay relationship between two internal circuits, in an alternative implementation, such phase delay relationships between two internal circuits can also be used for communicating information to the circuit board.

Figure 4:
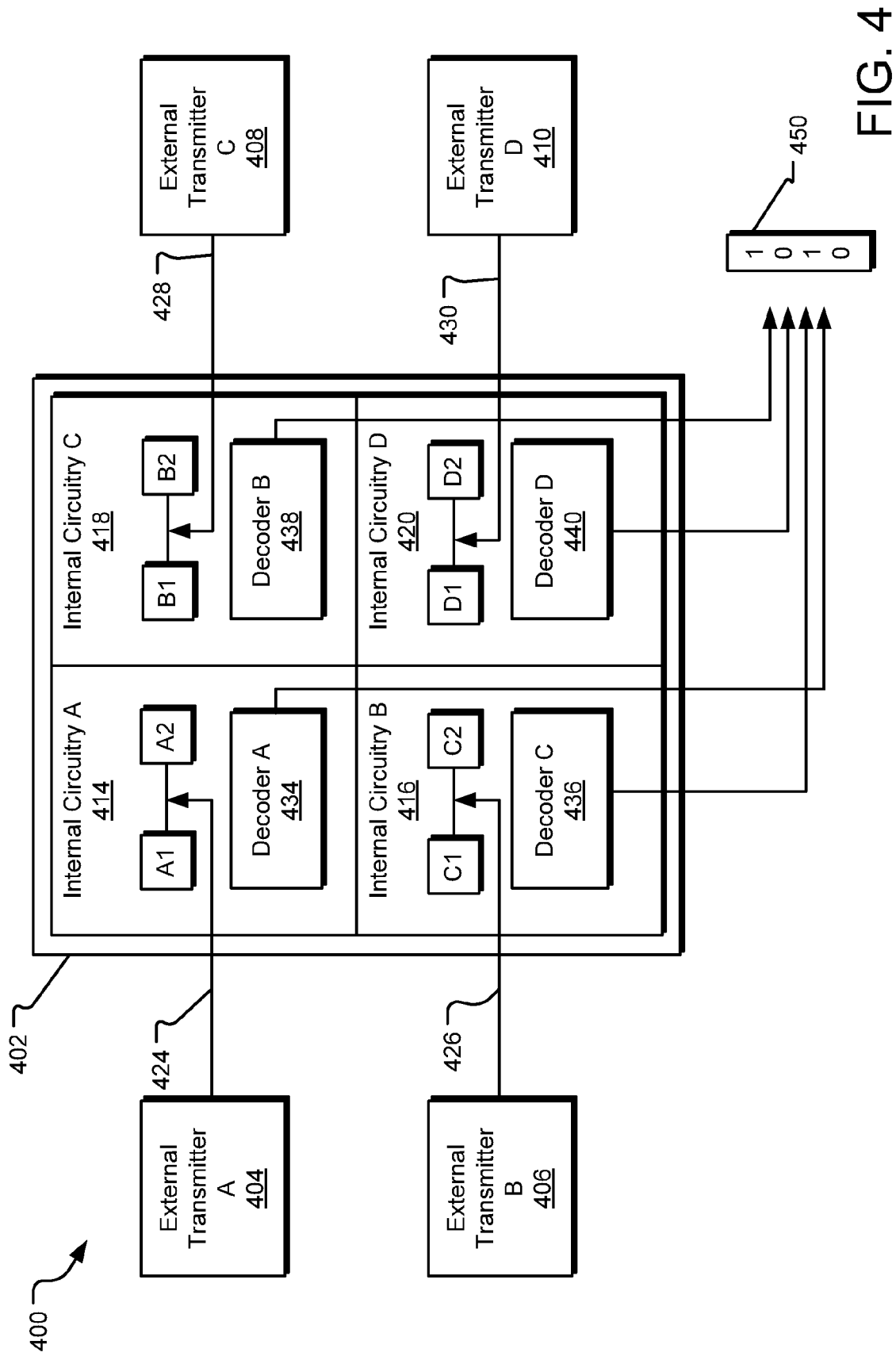
FIG. 4 illustrates example data sources and flows for a communication system.

FIG. 4 illustrates an implementation of a communication system 400 using the phase delay relationships of various internal circuits on a circuit board 402. The communications system 400 includes a number of external transmitters 304-310 that are configured to communicate with the circuit board 402. The circuit board 402 includes various interconnection circuitries 414, 418, 416, and 420. Each of the interconnection circuitries 414, 418, 416, and 420 is configured to communicate between various internal circuits. For example, the interconnection circuitry 414 communicates between a first internal circuit A1 and a second internal circuit A2.

The external transmitters 404-410 are configured to transmit external information signals to the interconnection circuitries 414-420 by affecting the phase delay relationships on the interconnection circuitries 414-420. For example, the external transmitter 404 sends a signal 424 to the interconnection circuitry A 414, the external transmitter 406 sends a signal 426 to the interconnection circuitry B 416, etc. Specifically, each of the external transmitters 404-410 is configured to send a signal to a particular interconnection circuitry of the receiver device 302 so as to affect the phase delay relationship between two internal circuits connected by that particular interconnection circuitry. Thus, for example, the external transmitter 404 sends the signal 424 to the interconnection circuitry A 414 so as to affect the phase delay relationship between the internal circuit A1 and the internal circuit A2.

Each of the interconnection circuitries 414-420 is associated with one of the decoders 434-440. Each of the decoders 434-440 is configured to measure and decode the change in the phase delay characteristics of the corresponding interconnection circuitries 414-420. For example, the decoder A 434 is configured to measure a phase delay and a change in the phase delay on the interconnection circuitry 414. Furthermore, the decoder A 434 is also configured to store such measured value of the phase delay, a value of the change in the phase delay, etc., into a memory of the decoder A 434.

The communication signal 424 from the external transmitter A 404 causes the phase delay on the interconnection circuitry 414 to change. For example, a positive communication signal 424 causes the phase delay on the interconnection circuitry 414 to increase. The decoder A 434 measures such change in the phase delay and compares the change to a threshold value. If the decoder A 434 determines that the detected change in the phase delay is above the threshold, it generates a bit "1" as the information communicated by the external transmitter A 404.

In a similar manner, the other external transmitters 406, 408, 410 also send information to the interconnection circuitries 416, 418, 420. The corresponding decoders 436, 438, 440 decode the information communicated by the signals 426, 428, 430 to generate output bits. The implementation of the communications system 400 illustrates that when the decoder A 434 generates a bit "1" as the value of the information communicated by the external transmitter 404, the other decoders 436, 438, 440 generate output bit values of "0," "1," and "0." As a result, cumulative output from the decoders 434-440 is "1010" 450.

While the communications system 400 illustrates the circuit board 402 as having four interconnection circuitries 414-420, in an alternative implementation, a greater or a lesser number of interconnection circuitries is provided. Furthermore, in an alternative implementation, each of the external transmitters 404-410 is implemented on a same transmitter device and a single decoder device is used to implement each of the decoders 434-440.

The maximum transfer rate that can be achieved by the communications system 400 depends on a number of factors including the number of distinct channels used for communicating with the circuit board 402, the distinct changes in phase delays on the interconnection circuitries 414-420 used for communication, the range over which the phase delay is varied, the speed at which the external transmitters 404-410 affect the phase delays on the interconnection circuitries 414-420, etc.

Figure 5:
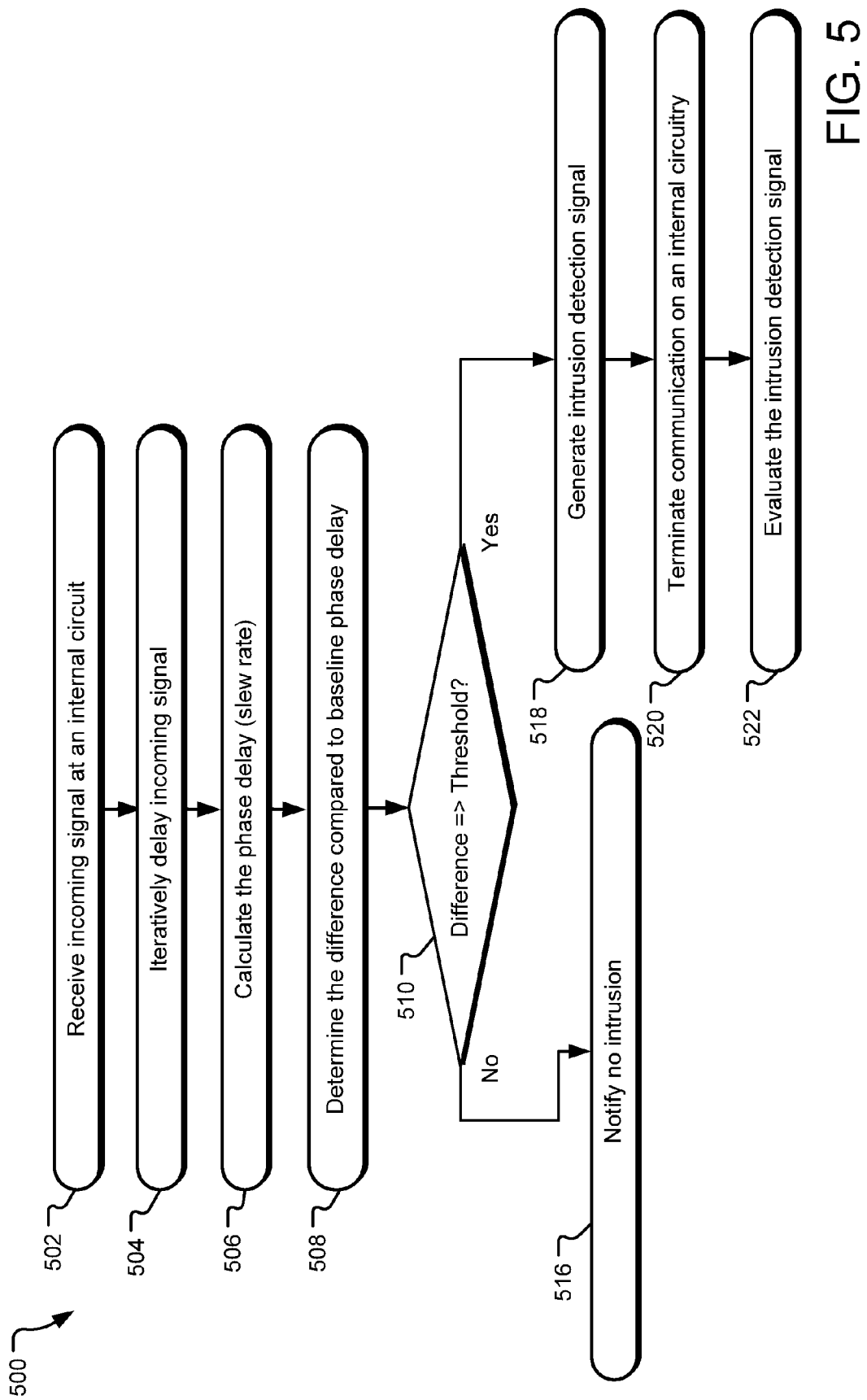
FIG. 5 illustrates example operations for an intrusion detection system.

FIG. 5 illustrates example operations 500 for an intrusion detection system for detection of tampering with a circuit board. A receiving operation 502 receives an incoming signal at an internal circuit. For example, the incoming signal is a signal from a first internal circuit on the circuit board to a second internal circuit on the circuit board. The phase delay of the incoming signal from the first internal circuit compared to a signal generated by the second internal circuit is a function of the operating characteristics of the first internal circuit, the operating characteristics of the second internal circuit, and the operating characteristics of an interconnection circuitry connecting the first internal circuit and the second internal circuit. Such phase delay is generally stable in absence of any changes to the operating characteristics.

A delaying operation 504 delays the incoming signal iteratively so that the phase of an internal clock signal and the phase of the delayed incoming signal are approximately locked. In one implementation, the delaying operation 504 delays the incoming signal iteratively according to a binary search process until the phase of the delayed incoming signal and the phase of an internal clock are approximately locked. Subsequently, a calculating operation 506 calculates the phase delay of the delayed incoming signal. In one implementation, the calculating operation 506 calculates the slew rate of the delayed incoming signal and uses he slew rate as the representation of the phase delay of the delayed incoming signal.

A determining operation 508 determines the difference between the calculated phase delay and a baseline phase delay. In one implementation, the baseline phase delay between the incoming signal from the first internal circuit compared to an internal signal generated by the second internal circuit is stored on a memory of the circuit board. For example, such baseline phase delay is calculated at the time the circuit board is used for the first time in the field. In an alternative implementation, the baseline phase delay is changed over time to reflect the changes in the operating condition of the circuit board. In one implementation, the difference between the calculated phase delay and the baseline phase delay is the difference between the calculated slew rate and a baseline slew rate stored in the memory on the circuit board.

Subsequently, an evaluating operation 510 evaluates the difference between the calculated phase delay and a baseline phase delay. In one implementation, the evaluating operation 510 compares such difference with a threshold value. The threshold value used by the evaluating operation is stored in a memory of the circuit board and specifies what level of phase delay is considered significant in representing an intrusion of the circuit board. For example, a relatively small difference between the calculated phase delay and a baseline phase delay is considered to be a result of minor changes in the operating conditions of the circuit board and therefore do not represent an intrusion to the circuit board.

If the evaluating operation 510 determines that the value of the difference is less than the threshold value, a notification operation 516 notifies that no intrusion has taken place. In which case, no further action is taken. On the other hand, if the evaluating operation 510 determines that the value of the difference is greater than or equal to the threshold value, a generating operation 518 generates an intrusion detection signal. In one implementation, the generating operation 518 also includes qualitative and/or quantitative information into the intrusion detection signal. For example, the intrusion detection signal includes the amount by which the difference between the calculated phase delay and a baseline phase delay is higher than the threshold.

Subsequently, a terminating operation 520 terminates communication in the interconnection circuitry. In an alternative implementation, the terminating operation also notifies an authority, such as a user or the circuit board about the potential tampering of the circuit board. Subsequently, an evaluating operation 522 evaluates the intrusion detection signal. For example, if there is any qualitative and/or quantitative information included in the intrusion detection signal, the evaluating operation 522 evaluates such information to determine the appropriate course of action. Thus, if the difference between the calculated phase delay and a baseline phase delay is larger than the threshold value by only a small amount, the evaluating operation determines that the circuit board operations can continue for all internal circuits except for the interconnection circuitry on which the intrusion is detected. However, if the difference between the calculated phase delay and a baseline phase delay is significantly larger than the threshold value, the evaluating operation determines that the entire circuit board be operated in a special debugging mode.

Figure 6:
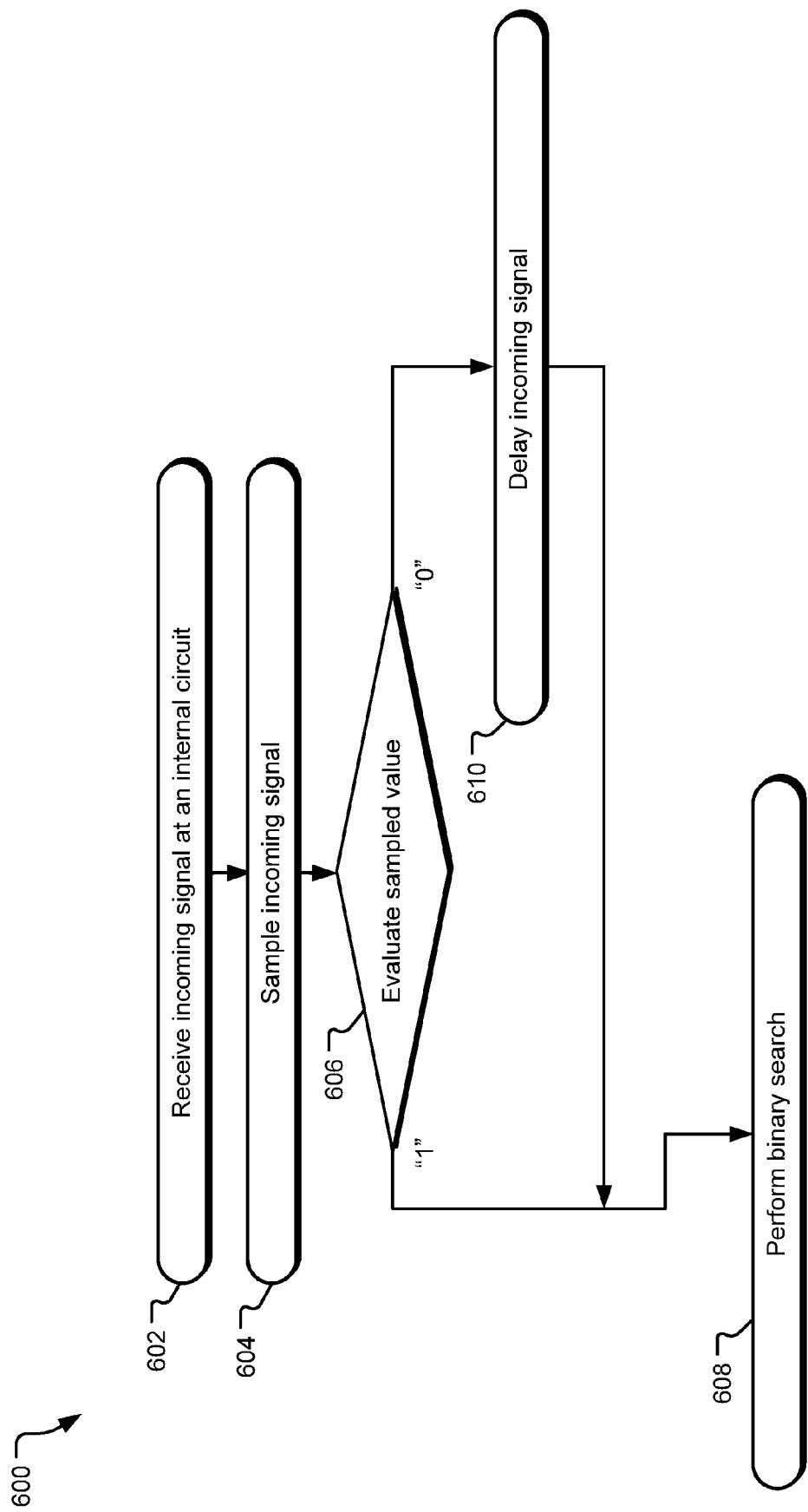
FIG. 6 illustrates example operations for determining phase delay of an incoming signal for an intrusion detection system.

FIG. 6 illustrates example operations 600 for determining phase delay of an incoming signal at an internal circuit on a circuit board. For example, the operations 600 are used to determine a change in the slew rate of an incoming signal at an internal circuit. An implementation of the intrusion detection system disclosed herein uses the operations 600 to determine a delay in a signal received at an input pin of an internal circuit. The operations 600 illustrate calculating the phase delay of an incoming signal using an internal clock signal generated on a second internal circuit. For example, the internal clock signal is a 100 MHz clock signal. An operation 602 receives the incoming signal. In the illustrated example operations 600, the incoming signal from a first internal circuit is also a 100 MHz clock signal. Thus, the periods of both the internal clock signal and the incoming signal are 10.0 ns.

A sampling operation 604 samples the incoming signal at the positive edge of the internal clock signal with 0.0 ns delay. Subsequently an evaluating operation 606 evaluates the sampled value of the incoming signal. If the sampled value of the incoming signal is 1, the incoming signal has changed before the positive edge of the internal clock signal. In this case, a binary search operation 608 performs a binary search to determine the approximate amount of delay.

Specifically, the binary search operation 608 iteratively delays the incoming signal by delay amounts over a number of cycles with the delay amount for each cycle being increased or decreased by an amount of delay that is equal to half the increment/decrement of the previous cycle. The binary search operation determines the approximate amount of delay between the incoming signal and the internal clock signal when the sampling for a given cycle produces the value of 1 whereas the sampling for the next cycle produces a value of 0.

On the other hand, if the evaluating operation 606 determines the sampled value of the incoming signal to be 0, the positive edge of the internal clock signal has occurred before the positive edge of the incoming signal. In this case, a delaying operation 610 delays the incoming signal by more than half the clock cycle, somewhere between 5 and 10 ns. Subsequently, the control is passed to the binary search operation 608.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
   storing a baseline value of a phase delay between a signal generated by a first integrated circuit (IC) and a signal received at the first IC from a second IC, the first IC and the second IC located on a circuit board;
   measuring a test value of a phase delay between a signal generated by the first IC and a signal received at the first IC;
   determining a difference between the test value of the phase delay and the baseline value of the phase delay; and
   generating a notification signal identifying a tampering with the circuit board if the difference is larger than a threshold.

2. The method of claim 1 wherein the baseline value of the phase delay is determined upon first usage of the circuit board.

3. The method of claim 1 wherein the signal received at the first IC is a signal from the second IC.

4. The method of claim 1 wherein the phase delay between the signal generated by the first IC and the signal received at the first IC is a function of the impedance of a circuit connecting the first IC and the second IC.

5. The method of claim 1 further comprising operating the circuit board in a debugging mode in response to the notification signal.

6. A device comprising:
   a detector configured to measure a change in value of an operating characteristic of an interconnection circuitry, the operating characteristic of the interconnection circuitry being dependent upon an impedance of the interconnection circuitry;
   a decoder coupled to the detector to receive the measured change in value of the operating characteristic from the detector and configured to decode the measured change in value of the operating characteristic to determine existence of an abnormal condition; and
   wherein the decoder is further configured to decode the measured value of the operating characteristic of the interconnection circuit by comparing the measured value of the operating characteristic of the interconnection circuitry with a baseline value of the operating characteristic of the interconnection circuitry.

7. The device of claim 6 wherein the operating characteristic of the interconnection circuitry is a phase delay on a component of the interconnection circuitry.

8. The device of claim 7 wherein the phase delay on the component of the interconnection circuitry is represented by a slew rate of a signal communicated on the component of the interconnection circuitry.

9. The device of claim 6 wherein the decoder is further configured to compare the measured value of the operating characteristic of the interconnection circuitry with the baseline value of the operating characteristic of the interconnection circuitry to generate a difference value.

10. The device of claim 9 wherein the decoder is further configured to generate a notification signal if the difference value is above a threshold value.

11. The device of claim 10 further comprising an actuator circuit configured to terminate communication using the interconnection circuitry in response to the notification.

12. The device of claim 6 further comprising a transmitter device configured to send a communication signal to the interconnection circuitry and wherein the decoder is further configured to decode the measured value of the operating characteristics to determine the communication signal.

13. A device comprising:
   a detector configured to measure a change in value of an impedance of an interconnection circuitry in response to an external input;
   a decoder configured to decode the measured value of the change received from the detector to determine existence of an abnormal condition; and
   wherein the change in the value of the impedance is calculated as a difference between a baseline value of impedance of the interconnection circuitry and a test value of impedance of the interconnection circuitry.

14. The device of claim 13 wherein the decoder is further configured to identify the abnormal condition as a tampering with a circuit board comprising the circuitry.

15. The device of claim 13 wherein the circuitry is an interconnection circuitry between a first integrated circuit and a second integrated circuit on a circuit board.

16. The device of claim 13 wherein the change in the value of the impedance is represented by a change in the phase delay on the circuitry.

17. The device of claim 13 further comprising an actuator circuit configured to terminate communication on the circuit in response to the notification signal.

18. The device of claim 13 wherein the decoder is further configured to identify the abnormal condition as a communication signal from a transmitter.

* * * * *